May 16, 1967 M. E. KROM 3,320,367

TELEPHONE LINE CIRCUIT

Filed Oct. 22, 1963 3 Sheets-Sheet 1

INVENTOR
M. E. KROM
BY
R. C. Winter
ATTORNEY

May 16, 1967 M. E. KROM 3,320,367

TELEPHONE LINE CIRCUIT

Filed Oct. 22, 1963 3 Sheets-Sheet 3

United States Patent Office 3,320,367
Patented May 16, 1967

3,320,367
TELEPHONE LINE CIRCUIT

Myron E. Krom, Minerva Lake, Ohio, assignor to Bell Telephone Laboratories, Incorporated, New York, N.Y., a corporation of New York Filed Oct. 22, 1963, Ser. No. 317,930
35 Claims. (Cl. 179—18)

This invention relates generally to telephone switching systems and particularly to special service line circuit arrangements within such systems. More particularly, this invention pertains to subscriber controlled circuit arrangements which enable the repeated transferal of a privileged line back and forth between a previously established connection and a subsequently established connection in privacy, or, in the alternative enables the adding on in conference fashion of an additional calling line to the previously established connection.

Extensive development of telephone switching systems in recent years has made possible the provision of numerous special features which render telephone service more convenient and more flexible. For example, circuit arrangements have been provided to enable a special service subscriber currently engaged in a telephone conversation to be advised via an audible calls-waiting signal that another call has been directed to his line. Other special service lines have been provided with another feature called add-on wherein an additional called line may be added to an existing connection in conference fashion.

It is obvious that the provision of such features requires the addition of special equipment associated with the special service line. In numerous instances, subscribers desire the provision of both of the aforesaid features. Because of the present state of the art, it is necessary in such cases to provide two independent circuit arrangements associated with the line; each arrangement operative to provide one of the features.

Accordingly, in the first instance, a need exists for a single circuit arrangement which is operative to provide both features as well as either feature. Further, a need exists for a call-waiting circuit arrangement whereby the calling party, as well as the called party, is advised of the call-waiting status of a call.

In addition to the above, a need exists for a calls-waiting circuit arrangement whereby the privileged line may be transferred back and forth between an initial connection and a subsequent calling party connection as frequently as desired. An finally, in order for the calls-waiting circuit arrangement to be effective in all situations, a need exists for an arrangement whereby an incoming call is arranged to camp-on the privileged line without interfering with the privileged line during the course of dialing by the privileged subscriber.

In view of the foregoing, an object of this invention is to provide a single circuit arrangement of simple and economical construction which is operative to provide the calls-waiting and add-on features.

A further object is to provide a combined calls-waiting and add-on circuit arrangement which is controlled by a privileged line in an exceedingly simple manner.

A further object is to provide a combined calls-waiting and add-on circuit arrangement wherein either or both of such features may be provided by a simple expedient not requiring changes within the subject circuit arrangement, itself.

Another object of the invention is to enable a privileged line which currently has two independent connections directed thereto to transfer from one such connection to the other and back again an unlimited number of times by means of a single subset manipulation.

Another object of the invention is to provide means automatically effective to inhibit interference with the privileged line by a call currently in a calls-waiting status during the interval that the privileged line is involved in a dial tone connection.

These and other objects of the invention are attained in accordance with an exemplary embodiment of the invention wherein the privileged line circuit is terminated in a switching circuit at the central office. The switching circuit, in turn, is terminated in regular and auxiliary line appearances assigned to the privileged line within the central office switching equipment.

The two line appearances of the switching circuit are arranged as a hunting group so that in the event of a busy condition of either appearance the call is directed to the other appearance.

The switching circuit's operation may advantageously be explained in terms of eleven relays. A first double wound relay is arranged with each winding in series with one side of the privileged line. Thus arranged, the first relay responds to a discrete signal consisting of the on-hook and off-hook condition of the subset as manifested by a switch hook flash whereby the subscriber controls the aforesaid features.

A second relay is normally associated with the regular appearance sleeve lead to provide supervision during the course of a dial tone connection from that appearance. As will be more apparent hereinafter, this same relay is associated with the auxiliary appearance sleeve lead to perform the same function when the subscriber has enabled the add-on feature. In addition, this same relay is also used to recognize an incoming call to the regular appearance when the subscriber is engaged in conversation via the auxiliary appearance, and is operative to thereupon enable the calls-waiting tone feature.

A third relay is normally associated with the auxiliary sleeve appearance to recognize an incoming call when the subscriber is engaged in conversation via the regular appearance, and to thereupon enable the calls-waiting tone feature.

A fourth relay is provided to indicate that a dial tone connection is in progress and is operative to disable the calls-waiting tone feature during this interval to prevent interference therewith.

A fifth relay is provided to indicate by its release that a call awaits completion and to provide an audible tone indicating this fact.

A sixth relay is provided to recognize that the privileged line has maintained an on-hook condition for a specified interval as a signal that the subscriber does not desire to answer an incoming call currently in a calls-waiting status.

A seventh relay is provided to permit the line, upon completion of a connection via the regular appearance, to be transferred to the auxiliary appearance in response to a calls-waiting signal.

Two additional relays are provided to respond to a switchhook flash and to thereupon transfer the privileged line from one appearance to the other.

Lastly, two relays are arranged to provide a holding bridge across the regular appearance or the auxiliary appearance in response to a transfer of the privileged line from one such appearance to the other.

Where the calls-waiting feature alone is required, the auxiliary line appearance is arranged for terminating service only. In similar fashion, when only the add-on feature is required, the auxiliary line appearance is arranged solely for originating service. However, where both features are required, the auxiliary line appearance is arranged as the second line of a two-line hunting group in the conventional manner. As will be more apparent hereinafter, the auxiliary line circuit is arranged for terminating or originating service by means of an expedient well known in the art which is external to the subject switching circuit.

In accordance with one feature of my invention, a single switching circuit provides a privileged line with both the calls-waiting and add-on features.

In accordance with another feature of my invention, a switching circuit provides a privileged line with two line appearances, each connectible to a different calling line, and responds to an unlimited number of switchhook flashes from the privileged line, each of which causes the connection of the privileged line to an alternate one of the two calling lines in privacy, while maintaining the other calling line in a hold condition.

In accordance with another feature of my invention, a switching circuit is controlled by an initial switchhook flash from a privileged line currently connected to a first line to thereby enable the subscriber to converse in privacy with a subsequent calling line while maintaining the first line in a hold condition.

In accordance with another feature of my invention, a switching circuit provides a privileged line with two line appearances, the first appearance of which is connectible to a called line in accordance with the dialed directory information provided by the privileged line, and the second appearance of which is operative to terminate a connection from a subsequent calling line and to thereupon delay the provision of an audible signal to the privileged line until the completion of the aforesaid dialing.

In accordance with another feature of my invention, a privileged line has two line appearances, each comprising a tip, ring, and sleeve conductor, each such appearance being operative to terminate a dial tone connection to the privileged line during the course of which a single sleeve conductor supervisory circuit is associated with whichever of the appearance is currently involved in the aforesaid dial tone connection.

In accordance with another feature of my invention, a switching circuit is associated with a privileged line in an arrangement such that after notifying the privileged line by an audible signal that another call awaits completion thereto, the switching circuit is operative to release the other call in response to an on-hook condition of the privileged line for a predetermined interval.

In accordance with another feature of my invention, a switching circuit is associated with a privileged line such that, upon completion of an initial connection, an unlimited number of additional parties may be added and released singly and in sequence to the established connection.

In accordance with another feature of my invention, a switching circuit is arranged to audibly signal a busy called party that another call currently in a call-waiting status has been directed to his line and to concurrently provide a distinctive signal in addition to audible ringing to the calling party to also advise the calling party of the call-waiting status of the call.

The foregoing objects and features, as well as others, of this invention will be more apparent from a consideration of the subsequent description and drawing, in which.

Figure 2:
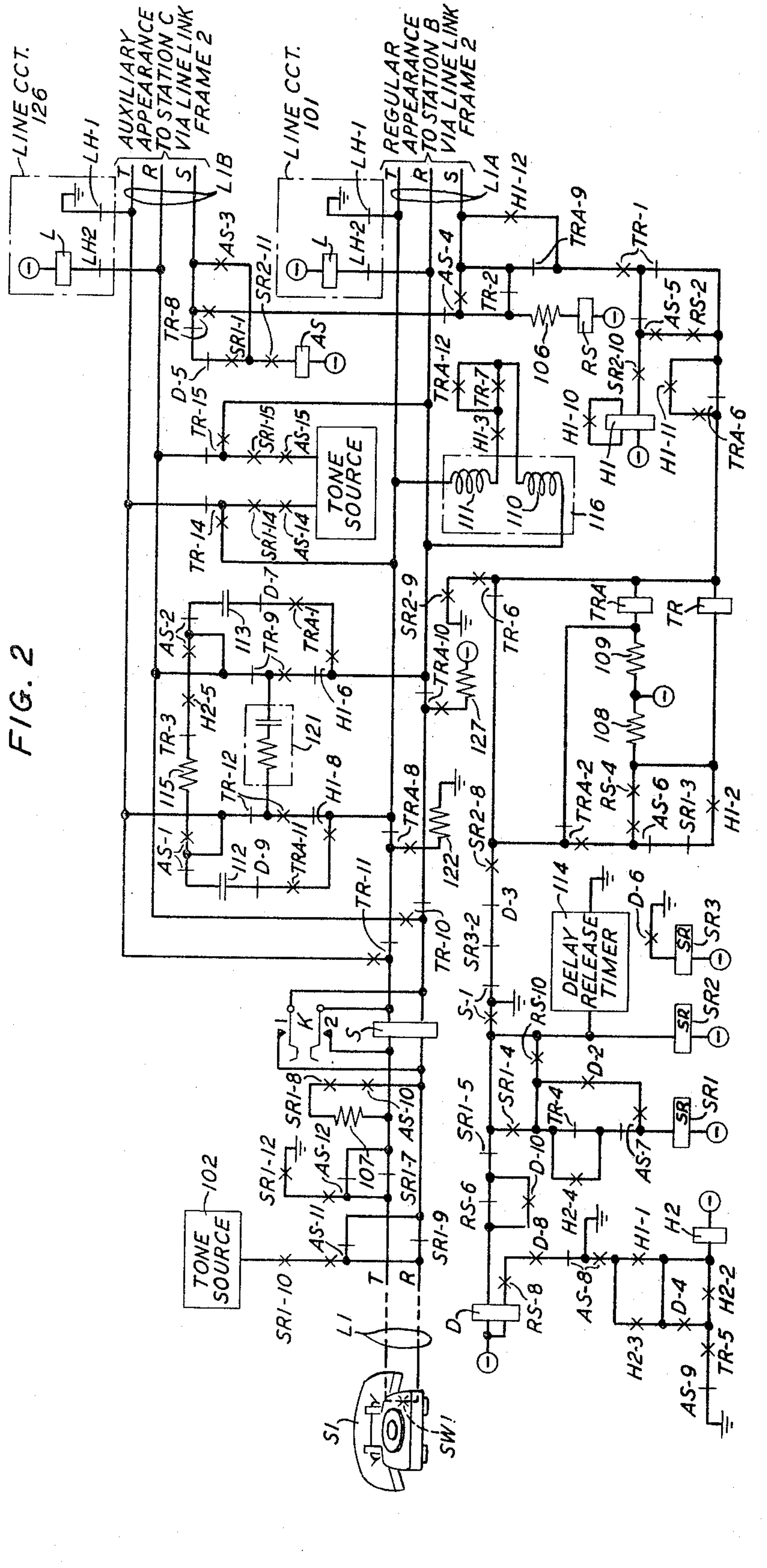
FIG. 2 shows in greater detail some of the components of the exemplary embodiment including one station and a switching circuit.
Figure 3:
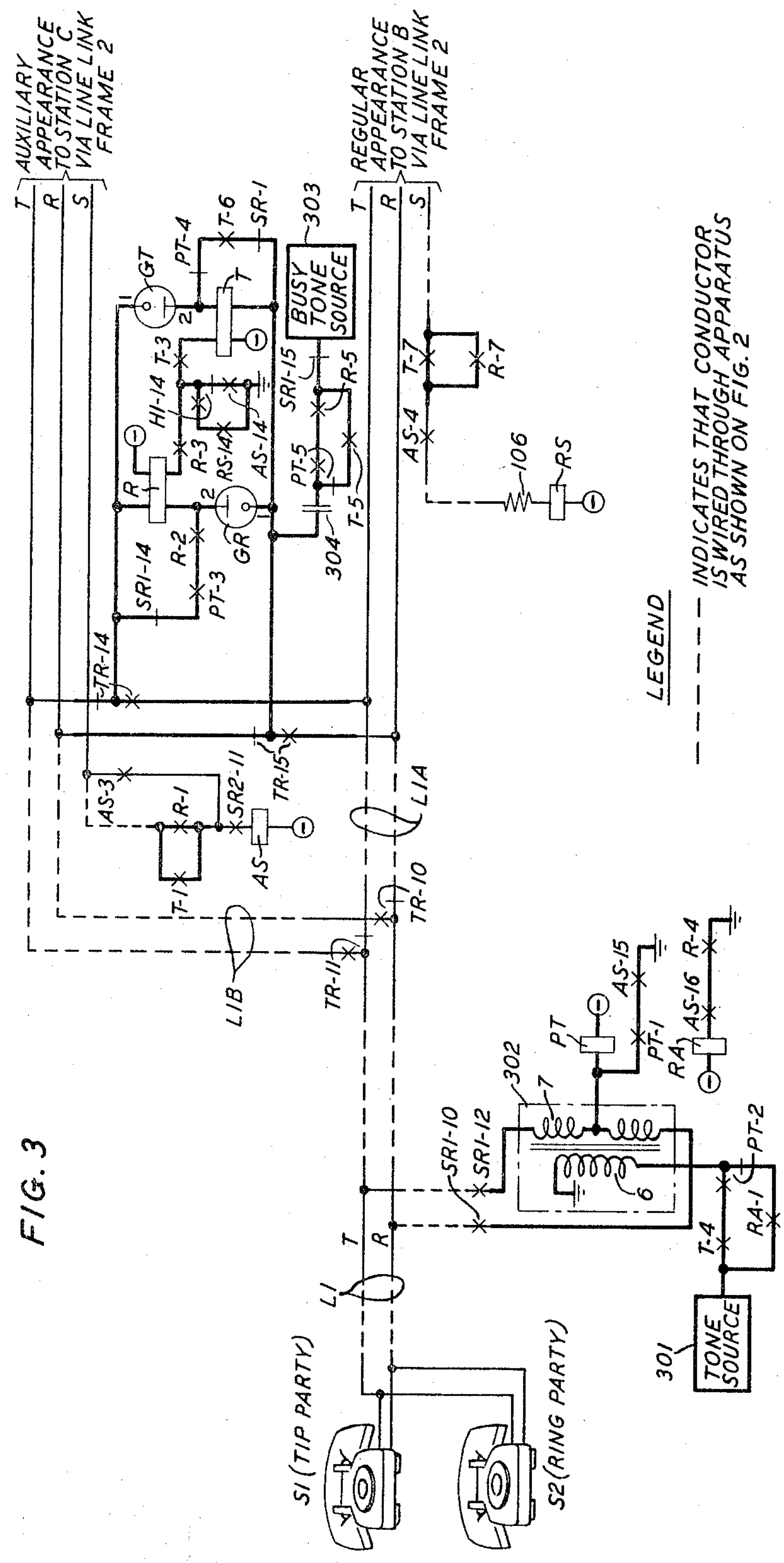
FIG. 3 shows in detail another aspect of the invention as applied to multistation lines.

It will be noted that FIGS. 2 and 3 employ a type of notation referred to as "detached contact" in which an "X" represents a normally open contact of a relay, and a bar, shown intersecting a conductor at right angles, represents a normally closed contact of a relay; "normally" referring to the unoperated condition of the relay. The principles of this type of notation are described in an article entitled "An Improved Detached-Contact-Type Schematic Circuit Drawing" by F. T. Meyer in the September 1955 publication of the American Institute of Electrical Engineers Transactions, Communications and Electronics, vol. 74, pages 505–513.

The switching circuit of the present invention may advantageously be incorporated in an automatic telephone system wherein common control circuits are employed to control the establishment of calls through a switching network. One such system is disclosed in the A. J. Busch Patent No. 2,585,904 issued Feb. 19, 1952. It is to be understood, however, that the present invention is not limited to use in a telephone system of this type, but may be utilized in other types of switching systems.

The invention is described herein as being embodied in a telephone system of the type disclosed in the cited Busch patent. It is particularly concerned with apparatus in switching circuit 1, which is represented by the block shown with heavy lines in FIG. 1. The other equipment units are neither shown nor described in detail, except where necessary for a complete understanding of the invention. The Busch patent may be consulted for a complete understanding of the construction and operation of components not covered in detail herein.

For purpose of illustration it is intended that the apparatus of line link frame 2, trunk line frame 3, outgoing trunk 4, incoming trunk 5, originating register 6, and marker and other common control circuits 7 be similar to the corresponding apparatus disclosed in the Busch patent.

Figure 1:
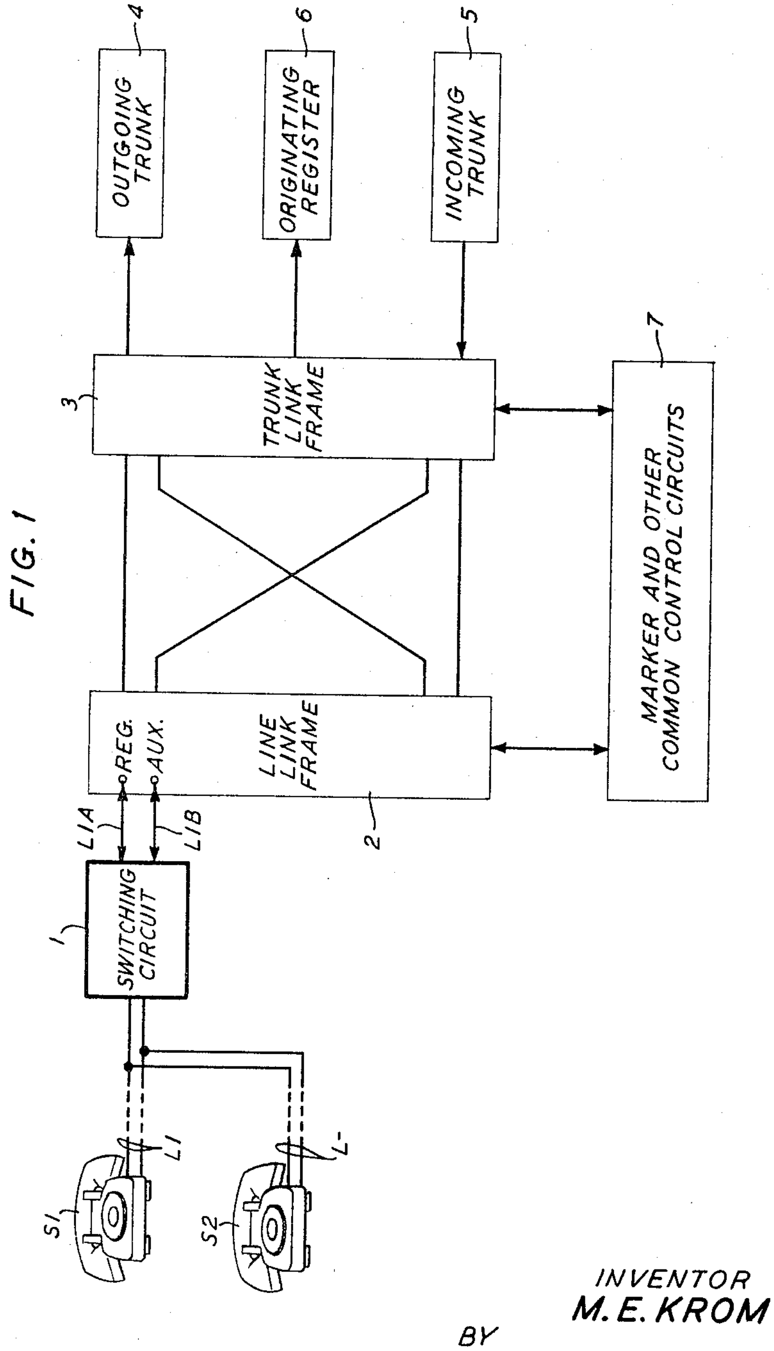
FIG. 1 is essentially a block diagram showing the interrelation of the components of the exemplary embodiment.

The interrelation and function of the equipment units of the exemplary embodiment will now be described with reference to FIG. 1. The interconnection between circuit blocks has been designated by arrows to show the direction of circuit action. A station S1, which is provided with both the call-waiting and add-on features, or either of such features, is connected over a line L1 to switching circuit 1. Switching circuit 1 provides a regular and an auxiliary appearance of line L1 via lines L1A and L1B, respectively, which terminate on line link frame 2. Other stations not provided with either or both of the aforesaid features are connected via their respective lines directly to line link frame 2 as set forth in detail in the Busch patent.

Trunk circuits, such as outgoing trunk 4 and incoming trunk 5, are shown with originating registers 6 as being terminated on trunk link frame 3. As is fully disclosed in the Busch patent, lines terminated on line link frames and circuits terminated on trunk link frames are interconnected by means of crossbar switches on these frames and by interframe junctors. All such interconnections are affected under control of a common group of circuits including marker and other common control circuits 7.

The regular appearance and the auxiliary appearance of switching circuit 1 may advantageously be provided with the busy line call transfer feature set forth in patent application, Ser. No. 300,369, of Messrs. Bean, Burns, Hayes and Klein, dated Aug 6, 1963, now Patent 3,278,-692, issued Oct. 11, 1966. Thus, a call which is directed to the regular appearance of station S1 is also directed to the auxiliary appearance and is completed to the auxiliary appearance if a busy condition is indicated at the regular appearance. It will be obvious from that which is contained hereinafter that, though the instant invention may be facilitated by the arrangement disclosed in the Bean et al. application, it is not dependent thereon.

FIG. 2 shows station S1 connected to switching circuit 1 via line L1. Switching circuit 1, in turn, is connected to two distinct line link frame appearances via lines L1A and L1B. In the following, the detailed description will be concerned primarily with the circuit operation of switching circuit 1. It is to be understood that all other circuit operations are as set forth in the aforesaid Busch patent and Bean et al. application which are hereby made a part of this application as though contained in detail herein.

For descriptive convenience the privileged station permanently associated with switching circuit 1 will be stations S1; a station connected to the regular appearance will be station B; and a station connected to the auxiliary appearance will be station C.

In order to facilitate the presentation of the detailed disclosure, the circuit description has been subdivided as follows:

1. *Call-waiting circuit operation—*
   1.1 Dial tone connection completed to station S1 via the regular appearance followed by incoming call to station S1 via the auxiliary appearance.
   1.2 Transfer of station S1 from the regular appearance to the auxiliary appearance.
   1.3 Transfer of station from the auxiliary appearance back to the regular appearance.
   1.4 Station B disconnects while stations S1 and C are connected.
   1.5 Station C disconnects while stations S1 and B are conversing.
   1.6 Dismissal of station C on the auxiliary appearance by station S1 without acceptance of the call.
   1.7 Initial call from station B to station S1 via the regular appearance.
2. *Add-on circuit operation—*
   2.1 Originating call from station S1 to add on station C to an existing connection between stations S1 and B.
   2.2 Release of station C from the auxiliary appearance by station S1.
   2.3 Disconnection of station B prior to the release of station S1 from the existing connection.
3. *Provision of signal advising the calling party of the call-waiting status of the call*
4. *Station S1 arranged for manual service*
5. *Line L1 arranged as a multiparty line—*
   5.1 Application of calls-waiting tone feature to multistation lines.
6. *Station S1 arranged for call-waiting service only*
7. *Station S1 arranged for add-on service only*
8. *Station S1 arranged as conventional line without special features*
9. *Conclusion*

1. CALL-WAITING CIRCUIT OPERATION

This section will describe in detail the manner in which switching circuit 1 provides the call-waiting feature to station S1. It will further describe in detail the manner in which station S1 controls the transferal of line L1 back and forth between stations B and C. In addition, this section will describe the various circuit actions upon disconnection by any of the three parties involved.

*1.1 Dial tone connection completed to station S1 via the regular appearance*

Referring to FIG. 2, when station S1 goes off-hook, switchhook contact SW1 is enabled in the well-known manner. As a result, negative battery is extended through the winding of line relay L in line circuit 101, through released break contact LH–2, released break contacts TRA–10 and TR–10, the lower winding of relay S, released break contact SR1–9, over the R conductor of line L1, through SW1 closed, via the T conductor of line L1, SR1–7 released, the upper winding of relay S, released break contacts TR–11 and TRA–8, to positive ground through released contact LH–1. As a result, relay L in line circuit 101 operates to cause the establishment of a connection to an originating register as set forth in detail in the A. J. Busch patent. In the instant embodiment, via the aforedescribed circuit path, relay S also operates in series with the L relay.

The operation of relay S enables make contact S–1 so as to operate relay SR2, and to also cause the operation of relay D via the extension of positive ground from make contact S–1, through SR1–5 and RS–6 released, through the upper winding of relay D to negative battery. The operation of relay D identifies this call as a dial tone call from station S1 and, as will be more apparent hereinafter, provides circuit means to protect line L1 from interference by a subsequent calling party during the course of dialing. The continued operation of slow release relay SR2, under control of enabled make contact S–1, indicates that an off-hook condition is being maintained by station S1. Relay SR3 also operates at this time under control of relay D by an obvious circuit.

As set forth in detail in the Busch patent, when the marker operates the line hold magnet on the line link frame, ground is applied to the S lead. Accordingly, when the dial tone connection is established to an originating register, ground applied to the S lead of the regular appearance is extended through break contact 2 of relay TR and resistance 106 to operate relay RS as an indication that a register has been connected.

The consequent operation of relay RS provides a locking path for relay D which extends from the lower winding of relay D through enabled make contacts RS–8 and D–8, through released break contact AS–8 to positive ground. It will be noted that the AS relay which is associated with the S conductor of the auxiliary appearance cannot operate at this time since the AS relay operate path is opened by enabled break contact 5 of relay D before contact 1 of relay SR1 is closed. Accordingly, as will be more apparent hereinafter, if an incoming call should currently be terminated to the auxiliary appearance, no circuit action would take place which would interfere with the dial pulses or other form of signaling generated from station S1.

The aforesaid operation of relay RS completes the operate path of relay SR1 which extends through AS–7 released, TR–4 released, RS–10 operated to ground on S–1 operated. Relay SR1 accordingly operates and locks operated to the S–1 contact via enabled make contact SR1–4, independent of the RS–10 make contact.

As set forth in detail in the Busch patent in column 97, lines 63 to 68, when dialing is completed, there will be a momentary release of the RS relay when ground is removed from the regular appearance of the S conductor during the course of the call back portion of the connection. This momentary release of relay RS opens the aforesaid locking path of relay D via the momentary release of make contact RS–8 thus releasing relay D, and thereby preparing a circuit through D–5 released for operating the AS relay associated with the S conductor of the auxiliary appearance.

If a call had terminated to the auxiliary appearance during the course of dialing by station S1, or, subsequent thereto, ground will be present on the auxiliary appearance S conductor. This ground operates relay AS upon the completion of dialing through released break contacts TR–8 and D–5, operated make contact SR–1, and operated make contact SR2–11, through the winding of relay AS to negative battery. Enabled make contact AS–3 thereupon provides a locking path for the AS relay to the S conductor of the auxiliary appearance. Concurrently therewith, station C will receive audible ringing, as set forth in the Busch patent; however, ringing tone is not impressed on line L1 since an inspection of FIG. 2 will reveal that L1B is not continuous with respect to line L1 at this time.

In this regard, it will be noted that a network such as network 121 is provided across the T and R conductors of line L1B through released break contacts TR12 and TR9, respectively, in order to satisfy the continuity test made by the marker circuit prior to establishing a connection to the auxiliary appearance. The aforesaid continuity test is described in detail in the cited Busch patent beginning therein in column 53.

Relay SR1 releases at this time via enabled break contact AS–7. Accordingly, tone is applied to the T and R conductors of line L1 via ground through make contacts SR1–12 and AS–12 to the T conductor; and via the tone source 102 through make contacts SR1–10 and AS–11 to the R conductor. It will be obvious from the aforesaid description that this tone will exist on line L1 only during the release interval of the SR1 relay. Accordingly, a momentary tone is provided to station S1 which is currently involved in a connection with station B via the regular appearance to indicate that a call is waiting on the auxiliary appearance. During the interval in which the tone is impressed on line L1 to station S1, a bridge is inserted between the T and R conductors of line L1 to maintain the connection toward station B, via resistance 107 and enabled make contacts SR1–8 and AS–10.

*1.2 Transfer of station S1 from the regular appearance to the auxiliary appearance*

If station S1 wishes to accept the call terminated to the auxiliary appearance, he may do so by momentarily depressing and then releasing the switchhook. When the switchhook is depressed, switchhook contact SW1 is released thereby opening the previously described operate path of relay S, releasing it. Relay TR thereupon operates from positive ground extended through S–1 released, SR3–2 released, D–3 released, SR2–8 operated, TR–6 released, through the winding of relay TR to negative battery through resistance 108. Relay TR locks operated through operated make contacts TR–6 and SR2–9 to positive ground. The ground which operates relay TR is extended through break contact TRA–6 released and make contacts RS–2, AS–5, and SR2–10 operated, through the winding of relay H1 to negative battery. Relay H1 accordingly operates.

The operation of relays TR and H1 enable make contacts TR–7 and H1–3, respectively, to provide a holding bridge across the regular appearance by completing the connection between windings 110 and 111 of retardation coil 116, thus maintaining the connection toward subscriber B.

When the switchhook is released, the S relay reoperates and enables break contact S–1 as hereinbefore described, thereby removing the shunting ground present at the junction point between resistance 109 and the winding of relay TRA. Accordingly, relay TRA operates 41 — Joe HAM — DAY Patents — APR. 27 — 39075 at this time. The operation of TRA enables make contact TRA–6 to provide a locking ground for relay H1 which extends through SR2–10 operated, AS–5 operated, RS–2 operated, H1–11 operated, TRA–6 operated, TR–6 operated to positive ground present on operated make contact SR2–9. As will be more apparent hereinafter, relay H1 is thus placed under control of the RS relay which, in turn, is controlled by ground present on the S lead of the regular appearance. The operation of make contact H1–1 completes the operate path of relay H2 by an obvious circuit thereby placing relay H2 under control of the operated AS–8 make contact.

The previously described operation of relay TR enables transfer contacts TR–11 and TR–10 to thereby switch the T and R conductors of line L1 to the correspondingly designated conductors of the auxiliary appearance. Thus, at this point station S1 is in telephonic communication with subscriber C via the auxiliary appearance, and the connection to station B is maintained in a hold condition via the aforesaid bridge network. It will also be noted that station B is excluded from the ensuing conversation.

*1.3 Transfer of station S1 from the auxiliary appearance back to the regular appearance*

If station B remains connected to the regular appearance, station S1 may be transferred back to the regular appearance by again flashing the switchhook. When the switchhook is depressed, switchhook contacts SW1 are restored to normal. Relay S then releases as hereinbefore described, and causes the release of the TR relay by providing a shunting ground through released break contacts S–1, SR3–2, D–3, and enabled make contacts SR2–8, TRA–2, AS–6, and RS–4 to the left side of the winding of relay TR.

When the switchhook is again released, relay S reoperates and enables break contact S1 which removes the TRA relay locking ground thus causing the release of the TRA relay. The release of make contact TRA–6 in turn opens the locking path of relay H1, releasing it. The release of relays TR, TRA, and H1 remove the bridge previously provided by retardation coil 116 across the regular appearance.

The continuity of the T and R conductors of line L1 to the regular appearance is restored by the release of transfer contacts TR–10 and TR–11; and concurrently therewith a holding bridge comprising resistance 115 is inserted across the T and R conductors of the regular appearance by enabled make contacts AS–1, AS–2, and H2–5, and released break contact TR–3. Subsequent switchhook flashes enable transfer of the connection of station S1 from the regular to the auxiliary appearance and back again as hereinbefore described.

*1.4 Station B disconnects while stations S1 and C are connected*

If station B has disconnected from the regular appearance while station S1 is connected to station C via the auxiliary appearance, relay RS will release by virtue of the removal of ground from the S conductor as set forth in detail in the Busch patent. Accordingly, released make contact RS–2 opens the previously described operate path of relay H1, releasing it. The release of break contact RS–6 completes the operate path of relay D as hereinbefore described. The operation of relay D in turn enables make contact D–10 to provide a locking path for relay D independent of the RS–6 relay contacts.

If another call should now terminate to the regular appearance, the RS relay will reoperate. Ground is thereupon extended to operate the SR1 relay through operated make contact S–1, operated make contact RS–10, operated make contact D–2, and operated make contact AS–7. The operation of relay SR1 applies tone to line L1 as hereinbefore described. The enabled break contact SR1–5 opens the operate path of relay D causing the release of that relay. Relay SR1 is thereupon released by the release of make contacts D–2 which opens the previously described operate path of relay SR1. Thus, at this time, as described hereinbefore for a call terminated to the auxiliary appearance, a call terminated to the regular appearance causes the impression of a tone upon line L1 during the release interval of the SR1 relay.

Station S1, having thus been advised that a new call has terminated to his regular appearance, may transfer his line to that appearance by flashing the switchhook as previously described.

If no further call terminates to the regular appearance after station B disconnects, station S1 is prevented from transferring back to the regular appearance merely by flashing the switchhook. This is accomplished by preventing the aforedescribed shunt release of the TR relay when the S relay releases, since the H1–2 make contact is not currently enabled. However, if the party at station S1 should desire to dismiss station C at this time so as to initiate another call from the regular appearance, he may do so by maintaining an on-hook condition of the switchhook for a predetermined interval. As described in detail in succeeding paragraph 1.6, relay SR2 will accordingly be released and cause the release of relays AS, TR, TRA and H1, thus restoring the circuit to normal. Upon releasing the switchhook, the off-hook condition of station S1 will cause the establishment of a dial tone connection to the regular appearance as hereinbefore described.

Station C may remain in an off-hook condition during this interval. However, such off-hook condition would be ineffective to maintain the connection to the auxiliary appearance since, as set forth in detail in the A. J. Busch patent, upon disconnection by the called party, timing means are effective in the associated trunk to cause release of the calling party. Thus, upon completion of a connection to station B, station S1 is enabled to utilize the auxiliary appearance for the calls-waiting feature as hereinbefore described, or for the add-on feature as hereinafter described.

*1.5 Station C disconnects while stations S1 and B are conversing*

When station C disconnects, the AS relay releases by virtue of the removal of ground from the S conductor of the auxiliary appearance as set forth in detail in the Busch patent. The release of make contact AS-8 causes the release of relay H2 by opening the H2 locking path, thus removing the bridge comprising resistance 115 from across the T and R conductors of the auxiliary appearance. The release of break contact AS–7 completes the previously described operate path of relay SR1 enabling the operation of that relay in preparation for repeating the call-waiting tone signal in the event that a new call arrives on the auxiliary appearance. If a new call is terminated to the auxiliary appearance, the circuit action which takes place is identical to that which has been hereinbefore described.

*1.6 New call by station S1 without accepting a call currently in a calling-waiting status on the auxiliary appearance*

The party at station S1, after conversing with the party at station B may desire to place a new call without accepting a call currently waiting on the auxiliary appearance. He may dismiss the waiting call merely by depressing the switchhook for a predetermined interval which exceeds the normal switchhook flash interval.

When the switchhook is depressed, relay S releases, and as hereinbefore described, operates relays TR and H1 and also opens the operate path of the SR2 relay. The operate path of relay SR2, however, is also provided with a delay release timer 114, which may comprise a number of configurations each well known in the art, such that, upon the removal of ground from the winding of relay SR2, delay release timer 114 will continue to impress a ground potential on the winding of the SR2 relay for a predetermined interval. If the on-hook condition of subset S1 is maintained for an interval exceeding that provided by delay release timer 114, relay SR2 is accordingly released. The release of relay SR2 restores make contacts SR2–8 and SR2–9 thus causing the release of relay TR. The release of make contact SR2–10 releases relay H1, and the release of make contact SR2–11 causes the release of relay AS, thus restoring the circuit to its normal condition.

When the switchhook is released at the end of the predetermined interval, a dial tone connection is completed to station S1 via the regular appearance as hereinbefore described. Station C continues to receive audible ringing during this time. If the party at station C does not abandon the call, then upon the release of relay D at the completion of dialing as hereinbefore described, relay AS reoperates and the call-waiting tone is repeated to line L1. The party at station A may then proceed to answer the call from station C, ignore station C, or may reinitiate a new call upon completion of the current conversation.

*1.7 Initial call from station B to station S1 via the regular appearance*

An incoming call from station B causes the operation of relay RS by ground present on the S lead of the regular appearance as set forth in the Busch patent. When the party at station S1 answers the call, relays S, SR1, and SR2 operate as hereinbefore described. However, relay D remains released since operated make contact RS–6 prevents closure of the previously described operate path of relay D. Thus, at this time, the apparatus in switching circuit 1 is in the same condition as described earlier upon the completion of a dial tone connection. Accordingly, the calls-waiting feature may be controlled by subscriber A as hereinbefore described.

If another incoming call should terminate to the auxiliary appearance prior to answering of the call via the regular appearance, the calls-waiting tone feature is not enabled since relay AS cannot operate until relays SR1 and SR2 have operated. This arrangement insures that the tone is not applied until and unless subscriber A has answered the call on the regular appearance.

2. ADD-ON OPERATION

The following paragraphs will describe in detail the manner in which a privileged station, such as station S1, is enabled to add on an additional party to an existing connection. It will be obvious from that which is contained hereinafter that the exercise of the add-on feature may be accomplished independently of the previously described calls-waiting feature or concurrently therewith, i.e., upon answering a call previously in a calls-waiting status on the regular appearance, station S1 may add on an additional party to the existing connection via the auxiliary appearance. Numerous other combinations of the add-on and calls-waiting features will also be obvious from the following.

*2.1 Originating call from station S1 to add on station C to an existing connection between stations A and B*

We shall assume, for purpose of explanation, that a connection exists between stations S1 and B via the regular appearance. This connection may have been established via an originating call from station S1 or a terminating call from station B; either of which calls would be completed exactly as set forth in the preceding section.

When the party at station A wishes to add another party to the existing connection, the switchhook is flashed in the same manner as explained for the exercise of the call-waiting feature. The consequent release of the S relay operates the TR and H1 relays as hereinbefore described.

The operation of relay TR enables make contact TR–1, thereby extending the operate path of relay H1, through the released TRA–9 break contact, to ground present on the S conductor of the regular appearance. Relay H1 accordingly operates and locks operated through make contact H1–12 independently of the aforesaid TRA–9 break contact. The operation of transfer contacts TR–11 and TR–10 connect line L1 through to the auxiliary appearance via the correspondingly designated conductors of line L1B. Enabled break contact TR–4 opens the operate path of relay SR1 to prevent its operation at this time.

The enabling of transfer contact TR–8 opens the AS relay operate path and switches the operate path of relay RS through to the S conductor of the auxiliary appearance. Enabled break contact TR2 disassociates the operate path of relay RS from its previous connection to the S conductor of the regular appearance. Relay RS is thus associated with the auxiliary appearance where it will now be operative to perform the same functions that it performed during the course of a dial tone connection via the regular appearance.

When the switchhook at station A is released, the S relay reoperates and enables the TRA relay to operate as hereinbefore described. The line L relay operates in line circuit 126 in a manner similar to that described hereinbefore for the equivalent L relay in line circuit 101 associated with the regular appearance. Relay D also operates at this time via its upper winding through a circuit comprising released break contacts RS–6, SR1–5 and enabled make contact S–1 to positive ground. Enabled make contact D–4 completes the obvious operate path of relay H2 which thereupon locks operated through enabled make contact H2–2.

At this point, as a result of the operation of relay L in line circuit 102, a dial tone connection is established to the auxiliary appearance as set forth in detail in the A. J. Busch patent. When an originating register has been connected to line L1B, relay RS operates from ground present on the S conductor of the auxiliary appearance. Relay SR1 reoperates at this time from negative battery extended through the SR1 winding through released break contact AS–7, operated make contact H2–4, operated make contact RS–10, to positive ground present on the operated S–1 contact.

During the interval in which the connection between stations S1 and C via the auxiliary appearance is being completed, it will be noted that a bridge is maintained across the regular appearance comprising retardation coil 116 as inserted therein by enabled make contacts TR–7 and H1–3.

At the completion of dialing ground is removed from the S conductor of the auxiliary appearance as hereinbefore described. Accordingly, relay RS releases, thereby releasing relay D by opening the lower locking winding operate path via released make contact RS–8. Released break contacts D7 and D9 thereupon complete a circuit from the respective T and R conductors of the auxiliary appearance through released break contacts AS1 and AS2, capacitors 112 and 113, enabled make contacts TRA–11 and TRA–1 and operated make contacts H8 and H6, through to the T and R conductors of line L1A, thus establishing a talking path among stations S1, B, and C. It is obvious that in addition to the above, suitable amplifying apparatus may be automatically switched in on the connecton at this time, if required.

*2.2 Release of station C from the auxiliary appearance by station S1*

Numerous conditions may arise wherein the party at station S1 desires to release the connection established to station C. For example, rather than a connection being completed to station C, a busy tone indication or overflow indication may have been received by station S1; or the connection may, in fact, have been completed but have served its purpose. In any event when the party at station S1 wishes to release the connection on the auxiliary appearance, he again flashes the switchhook, thereby causing the release of relays TR and TRA, as hereinbefore described, thus restoring the continuity of line L1 through to line L1A independent of any connection to line L1B.

Another station may be added via the auxiliary appearance by again flashing the switchhook thus causing the circuit operation hereinbefore described to be repeated. As many such connections as desired may be placed one at a time in this manner. It is, of course, obvious that such connections may be succeeded or preceded by incoming calls to the auxiliary appearance wherein the call-waiting feature is utilized in lieu of the add-on feature.

*2.3 Disconnection of station B prior to the release of station S1 from the existing connection*

As described in the immediately preceding section, if it is desired to dismsiss station C via the auxiliary appearance, the switchhook at station S1 is flashed, thereby reconnecting station S1 exclusively to station B via the regular appearance. However, if station B has disconnected prior to an attempt to transfer by station S1, relay H1 will have released by virtue of the removal of ground from the S conductor of the regular appearance. Accordingly, a switchhook flash from station S1 and the resulting release of the S1 relay will not provide a shunting ground, as hereinbefore described, to cause the release of relay TR, since the shunt release path to the junction point of resistance 108 and the left side of the TR winding will be opened by the released condition of make contact H1–2. Accordingly, in order to release the connection from the auxiliary appearance, it will be necessary for the subscriber to maintain an on-hook condition of subset S1 for a predetermined interval sufficient to cause the release of relay SR2, as hereinbefore described, thus restoring the circuit to normal.

3. PROVISION OF SIGNAL ADVISING THE CALLING PARTY OF THE CALL-WAITING STATUS OF THE CALL

As described hereinbefore, when the party at station S1 is busily engaged in conversation with the party at station B via the regular appearance or with the party at station C via the auxiliary appearance, the circuit is arranged to provide an audible indication to station S1 indicating an incoming call on whichever of the appearances is currently idle. While this arrangement is satisfactory for station S1, the calling party, under normal conditions, would be unaware of whether or not station S1 is currently busy on the other appearance. This is true, since the calling party in either event hears audible ringing. As will be apparent from the following, means are provided to inform the calling party that the called party is currently engaged in a conversation, but has been advised of the call-waiting status of the incoming call.

As described earlier, a tone is impressed on line L1 by tone source 102 when a circuit condition comprising the operated state of relays SR1 and AS exists. Further, as disclosed hereinbefore, relay TR is in an operated condition only when station S1 is connected to the auxiliary appearance and conversely is in a released condition when station S1 is connected through to the regular appearance.

Accordingly, tone source 120, which may comprise a number of configurations well known in the art, is operative to impress a tone across the T and R conductors of the regular appearance for a condition comprising the operation of relays AS, SR1 and TR9 manifested by their respective contacts numbered 14 and 15. Thus, with relay TR operated, station S1 is associated with the auxiliary appearance, and accordingly, when an incoming call is completed to the regular appearance, momentary tone is impressed across the regular appearance in addition to the conventional audible ringing tone so as to advise the calling party that his call is currently in a call-waiting status at this time.

With relay TR released, however, transfer contacts 14 and 15 of that relay connect the tone source to the auxiliary appearance of switching circuit 1 so as to provide this tone in like manner to a calling party whose connection has terminated to the auxiliary appearance.

Thus, the calling party is made aware of the fact that a longer than normal delay may be encountered prior to the answer of his call because of an existing connection established to station S1.

4. STATION S1 ARRANGED FOR MANUAL SERVICE

Manual service is an arrangement often provided in the past where, because of central office equipment limitations, a station was equipped with a subset possessed of no signaling means other than a conventional switchhook. An off-hook condition of the subset alerted an associated operator switchboard position for completion of the call. Today, of course, the equipment provided in modern central offices obviates such a limitation. However, arrangements have been made in such modern central offices for a manual class of service, since such service is still required by certain subscribers because of physical incapacity and also because certain subscribers have need for immediate connection to an operator on an emergency basis.

Referring now to FIG. 2, and assuming that station S1 is arranged for manual service, it will be recognized that originating and terminating calls, including the exercise of the add-on and calls-waiting features, may take place exactly as hereinbefore described. The only distinction is that, on originating calls from station S1, when a register is connected to station S1, no digits are dialed by that station, but rather the zero operator indication relays are operated automatically in the originating register by virtue of the manual class of service indication of the line as shown in detail in the Busch patent. An operator position is thereupon connected to station S1 and such originating calls are completed per verbal instructions from the subscriber.

5. LINE L1 ARRANGED AS A MULTIPARTY LINE

In many central office areas multiparty service is made optionally available to telephone subscribers because of a restricted need on their part for telephone service, and also such service is sometimes mandatory because of the unavailability of telephone facilities to supply the demand.

The instant invention in such cases may be shared by the parties to a multiparty line. Referring to FIG. 1, station S2 is shown connected in parallel to station S1 by line L— to typify one of such parties. It is obvious, of course, that a greater number of such stations may be provided in parallel with line L1 in the well-known manner.

When so arranged, stations S1 and S2 may initiate and receive calls via switching circuit 1. In so doing, circuit action for the calls-waiting and the add-on features will proceed as hereinbefore described.

It is recognized that in the case of the calls-waiting feature, upon receipt of a calls-waiting tone by a party at either of stations S1 or S2, such party would be unaware as to whether or not the call were directed to his particular station or to an associated party station. Accordingly, FIG. 3 shows another aspect of the invention which obviates this objection. As described in detail in succeeding section 5.1, detecting means are provided in switching circuit 1 to detect which of the stations are currently utilizing switching circuit 1 and other detecting means are associated with the line appearances so as to detect toward which of the stations an incoming call is directed. Thus, only when the output of the aforesaid detectors match, the calls-waiting tone feature is enabled thereby advising the privileged station that an incoming call has been directed specifically to that station.

*5.1 Application of calls-waiting tone feature to multistation lines*

As discussed in preceding Section 5, a plurality of stations on a multistation line may advantageously share the features of the invention. In this regard, FIG. 3 shows another aspect of the invention wherein means are provided to prevent a calls-waiting tone signal from being impressed upon a multistation line when an incoming connection is directed toward a station on such line which is not currently engaged in an existing connection. To simplify the illustration of this aspect of the invention, only that equipment which is additionally required in switching circuit 1 has been shown. Thus, FIG. 3 includes the apparatus shown in FIG. 2 in addition to the apparatus shown with heavy lines on FIG. 3.

For purpose of explanation, we shall assume that a multiparty line L1 is arranged with two stations, S1 and S2, in the well-known two-party line manner. We shall also assume that station S1 comprises the tip party of the two-party line and that station S2 comprises the ring party of the two-party line. We shall further assume that station S1 has established a connection via the regular appearance as hereinbefore described in detail.

When a subsequent incoming connection is completed to the auxiliary appearance, ground is applied to the S conductor as described hereinbefore. Simultaneously therewith ringing potential is applied either to the T conductor of the auxiliary appearance or to the R conductor of the auxiliary appearance. As is well known in the art, the particular conductor upon which the ringing potential is impressed is determined by the station toward which the call is directed. Assuming that the call is directed to tip party station S1, this ringing potential is applied to the T conductor and is impressed upon terminal 1 of tube GT through released break contact TR–14 with respect to ringing ground existent on conductor R which is impressed on terminal 2 of tube GT through released break contact TR–15 and the right winding of relay T. Tube GT accordingly conducts and sufficient current flows through the winding of relay T to operate that relay. The operation of make contact T–1 completes the operate path of relay AS which extends through enabled make contact SR2–11 to ground present on the S conductor of the auxiliary appearance. Relay AS accordingly operates and closes make contact AS–14 to complete an obvious locking path for relay T through its left winding.

Since we have assumed that the call originated from tip party station S1, relay PT will operate via a circuit which extends through enabled make contact SR1–12 to ground which is present on the tip conductor in the well-known manner for tip party stations. Accordingly, tone source 301, which may comprise any number of configurations well known in the art, applies a calls-wating tone signal through enabled make contacts T–4 and PT–2 through winding 6 of transformer 302. This tone is impressed via the secondary winding 7 of transformer 302 through enabled make contacts SR1–10 and SR1–12 to the R and T conductors, respectively, of line L1 to station S1.

As described in preceding sections, the operation of relay AS causes the release of relay SR1. Therefore, tone is applied momentarily during the release interval of the SR1 relay contacts. The party at station S1 upon hearing the tone may answer the incoming call via the auxiliary appearance, may ignore the incoming call, or may dismiss the incoming call as set forth in detail in preceding sections.

If the incoming call had been directed to ring party station S2, which we have assumed is currently inactive, then the ringing potential applied to the R conductor of the auxiliary appearance would result in the enabling of the R relay in a manner similar to that hereinbefore described for the T relay. Accordingly, the operation of make contact R–1 operates the AS relay, which thereupon provides a locking ground for the R relay via negative battery through its right winding, enabled make contact R–3, released break contact H1–14, to positive ground on the AS–14 make contact. Relay RA thereupon operates at this time by negative battery through the RA winding, enabled make contacts AS–16 and R–4 to positive ground. The consequent operation of make contact RA–1 does not enable transformer 302 at this time since break contact PT–2 is currently enabled indicating that the station originating the call is a tip party station. Thus, calls waiting tone is not transmitted to tip party station S1.

The operation of relay AS at this time also causes the release of the SR1 relay, thereby releasing break contact SR1–14 which, in conjunction with enabled make contacts PT–3 and R–2, provide a shunt around the left winding or relay R. The full ringing potential is accordingly impressed across tube GR which, during conduction, appears as a momentary D.C. short across the T and R conductors of the auxiliary appearance, thereby tripping ringing in the well-known manner. Concurrent therewith busy tone source 303, which may comprise any one of a number of configurations well known in the art, applies busy tone to the R conductor through SR1–15 released, R–5 operated, PT–5 operated, through capacitor 304, released break contact TR–15 to the R conductor of the auxiliary appearance. Accordingly, the calling party is advised by the audible busy tone signal that the station to which he has directed the call is currently not available. Upon abandonment of the connection to the auxiliary appearance, ground is removed from the S conductor thereby releasing relay AS and restoring the circuit to normal.

As described in preceding sections, a situation may arise wherein a station, such as S1, is currently involved in a connection to station C via the auxiliary appearance while the regular appearance is in an idle condition. At this time, as described hereinbefore in detail, relay TR will be in an operated condition. As shown in FIG. 3, the ringing detection relays are thereupon associated with the regular appearance through operated make contacts TR–15 and TR–14. When this condition prevails, an incoming call directed to the regular appearance will cause the operation of the T or R relays in the same manner as hereinbefore described for the auxiliary appearance.

While the above description refers primarily to circuit action which takes place when the tip party is active, an inspection of FIG. 3 will reveal that, in like manner, when the ring party is active the call-waiting or busy tone source is enabled or inhibited as dictated by the called station identity. Thus, the calls-waiting tone feature is enabled only where the call is directed to the particular station which is currently engaged in conversation via the auxiliary appearance as indicated by the operated or released state of relay PT.

6. STATION S1 ARRANGED FOR CALLS-WAITING SERVICE ONLY

Numerous conditions may arise wherein station S1 desires provision of the call-waiting feature exclusive of the add-on feature. This may be accomplished by arranging the auxiliary appearance of switching circuit 1 for terminating service only. Numerous devices well known in the art and external to switching circuit 1 may be utilized for this purpose. For example, relay L in line circuit 102 may be blocked nonoperated so as to prevent the establishment of a dial tone connection to the associated appearance thus rendering the provision of the add-on feature readily available merely by restoring the aforesaid L relay to its normal condition.

7. STATION S1 ARRANGED FOR ADD-ON SERVICE ONLY

Numerous conditions may arise where provision of the add-on feature is desired exclusive of the calls-waiting feature. This may be accomplished readily by means external to the instant switching circuit by arranging the auxiliary line for originating service only. For example, the regular appearance of switching circuit 1 may be arranged as a conventional single line appearance rather than as the first line of a two-line hunting group, as set forth hereinbefore. Accordingly, when a call is directed to the published directory number of station S1, if that station is busy, the calling party automatically receives a busy line indication rather than being routed to the auxiliary appearance for completion of the connection.

8. STATION S1 ARRANGED AS A CONVENTIONAL SUBSCRIBER LINE WITHOUT SPECIAL FEATURES

Numerous occasions may arise wherein it is desired to utilize the calls-waiting and add-on features for limited periods, so that the ability to have both of such features temporarily disabled becomes attractive. As shown on FIG. 2, this may be accomplished by manually operating locking key K. The operation of key K will, via enabled contacts 1 and 2, shunt the upper and lower windings, respectively, of relay S. Accordingly, on an originating call from station S1 only the L relay in line circuit 101 is operated to cause the establishment of a dial tone connection. Subsequent switchhook flashes from station S1 will not cause the operation of relay S, the operation of which has been inhibited by the aforesaid shunting contacts on key K. Thus, a subscriber at station S1 will be prevented from untilizing the add-on or calls-waiting features. If required, the auxiliary appearance may also be arranged, as set forth hereinbefore, for originating service only, thus completely inhibiting the functioning of switching circuit 1, while maintaining the status of switching circuit 1 as readily available for subsequent use by station S1 when so desired.

9. CONCLUSION

While the equipments of this invention have been described with reference to a particular embodiment in an arrangement whereby a privileged telephone line is associated with a switching circuit for purposes of controlling the add-on and calls-waiting feature, it is to be understood that such an embodiment is intended only to be illustrative of the present invention and that numerous other arrangements may be devised by those skilled in the art without departing from the spirit and scope of the invention.

For example, the invention may be used in instances in which the privileged line adds on a recording device in lieu of another station to the existing connection.

Another example would be where the switching circuit is operative to automatically connect the called station to the subsequently calling station within a predetermined interval after the enabling of the audible calls-waiting tone.

Another example would be where switching circuit 1 is utilized to automatically interconnect data processing machines in response to signals therefrom in lieu of the interconnection of telephone lines.

What is claimed is:

1. In a switching system,
a special service line having two line appearances and comprising selectively operable means for generating a discrete signal,
means for connecting a calling line to said special service line responsive to a busy condition of one of said appearances for selecting the other of said appearances and for thereupon transmitting a call-waiting tone to said special service line, and
means responsive to each repetition of a discrete signal from said special service line for alternately connecting said special service line exclusively to each of said appearances.

2. In a switching system,
the combination set forth in claim 1 further comprising other lines,
and means operative upon the idle condition of said other appearance and responsive to another discrete signal from said special service line for enabling said special service line to add on via said other appearance one of said other lines in conference fashion.

3. In a switching system,
the combination set forth in claim 2 further comprising means enabled upon the adding on of said other line responsive to a further discrete signal for releasing said other line and for thereby restoring said other appearance to an idle condition.

4. In a switching system,
the combination set forth in claim 1 further comprising means responsive to said discrete signal for providing a holding bridge on either of said appearances upon connection of said special service line to the other of said appearances.

5. In a switching system,
the combination set forth in claim 1 further comprising transmitting and receiving means selectively connectable to said special service line, and wherein said discrete signal comprises the sequential disconnection from said line and reconnection to said line of said transmitting and receiving means.

6. In a switching system,
the combination set forth in claim 5 further comprising timing means enabled upon the passage of a predetermined time interval between said disconnection and said reconnection of said transmitting means and said receiving means for releasing said calling line from said other appearance.

7. In a telephone system,
the combination set forth in claim 2 further comprising manually operable disabling means for inhibiting said connecting means and said enabling means.

8. The combination set forth in claim 1 wherein said selectively operable means comprises a subset connected to said special service line operative to generate said discrete signal by an on-hook condition of said subset followed by an off-hook condition of said subset, and timing means enabled in response to said on-hook condition for releasing said calling line after a predetermined interval, and means operative in response to said off-hook condition for inhibiting said timing means.

9. In a telephone system,
a line having a regular and an auxiliary appearance,
a first circuit from said line to said regular appearance,
and means for establishing a conference connection comprising means for opening said first circuit and for establishing a second circuit from said line to said auxiliary appearance, and
means responsive to the completion of a call connection via said second circuit for interconnecting said regular and auxiliary appearances.

10. A telephone system comprising a plurality of lines each comprising selectively operable means for generating a discrete signal,
one of said lines having a plurality of appearances each comprising a multiconductor communication path, a supervisory conductor, and supervisory signal detecting apparatus,
means connecting said one line to the communication path of a first one of said appearances,
means for associating said supervisory signal detecting apparatus with said first appearance supervisory conductor,
means for enabling a connection to be established from said one line to another of said lines via said first appearance,
means responsive to a discrete signal from said one line for disconnecting said one line from said first appearance, for bridging said first appearance, for connecting said one line to the communications path of a second one of said appearances, for disconnecting said supervisory signal detecting apparatus from said first appearance supervisory conductor, and for connecting said supervisory signal detecting apparatus to said second appearance supervisory conductor,
means for enabling a connection to be established from said one line to an additional line via said second appearance, and
means operative in response to establishment of the connection between said additional line and said one line for adding said other line to the connection in conference fashion.

11. The combination set forth in claim 10 wherein said supervisory signal detecting apparatus comprises a relay device having at least one operating winding.

12. The combination set forth in claim 10 wherein said adding means comprises means operative in response to a repetition of said discrete signal.

13. The combination set forth in claim 10 further comprising a subset connected to said one line and wherein said discrete signal comprises a momentary interruption of the continuity of the said one line caused by a corresponding momentary depression of the switchhook associated with said subset.

14. In a telephone switching system,
a plurality of multiconductor lines,
a subset exclusively connected to each of said lines, and
a switching circuit connected to one of said lines comprising a plurality of line appearances each having a multiconductor communication path and an associated supervisory conductor,
a call-waiting tone source connectable to said one line,
first means controlled by said one line for detecting the off-hook and on-hook condition of the subset connected to said one line,
second means connected to said first appearance supervisory conductor for indicating a response to the off-hook condition of said subset,
third means enabled by said first means for indicating that said one line has initiated a request for service,
fourth means connected to the supervisory conductor of said second appearance and operative to indicate that an incoming connection has been established to said second appearance,
fifth means controlled by said first, second, third and fourth means for enabling said tone source,
sixth means controlled by said third means for indicating that said switching system has responded to said one line's request for service and has satisfied said request,
seventh means controlled by said first means for causing the disconnecting of said one line from said first appearance, the bridging of said first appearance, and the connecting of said one line to the communications path of the second of said appearances, and
eighth means controlled by said first means for causing the disconnection of said one line from said second appearance, the bridging of said second appearance, the removal of the bridge from said first appearance, and the reconnection of said one line to said first appearance.

15. In a telephone system,
the combination set forth in claim 14 wherein
said first means comprises a multiwinding relay wherein each winding is connected in series with the conductors of said one line.

16. In a telephone system,
the combination set forth in claim 14 wherein said switching circuit further comprises timing means, and a relay controlled by said first means and said timing means for releasing said fourth means.

17. In a telephone system, a subscriber line having a regular and an auxiliary line appearance, means for normally connecting said subscriber line to said regular line appearance and for transferring said subscriber line to said auxiliary appearance, and means responsive to the origination of a call by said subscriber line over said auxiliary line appearance after operation of said transferring means for establishing a distinct connection between said auxiliary and regular line appearances independent of said connecting and transferring means.

18. In a telephone system,
a plurality of lines,
means for completing connections between respective calling and called ones of said lines,
means operable upon completion of said connections for impressing an alerting signal on said called lines to indicate the called status of said lines, and
means operable concurrently with said last-mentioned means for returning an audible manifestation of said alerting signal to each respectively associated calling line,
certain of said called lines being arranged for special service wherein means are provided operative upon the termination of one of said connections involving one of said special service lines for placing another calling line in a call-waiting status, means for inhibiting the impression of said alerting signal on said called special service line, means for providing a first advisory signal to said special service line to indicate that said other calling line has been placed in a call-waiting status, means controlled by said special service line for connecting said special service line to said other calling line; and means concurrently operable with said first advisory signal means for providing a second advisory signal to said other calling line to advise said other line of the call-waiting status of the connection.

19. In a telephone system, a special service line having two sets of line appearances, means for establishing a call connection via a first one of said appearances to said special service line, means for establishing another call connection to the second one of said appearances, and switching means comprising means responsive to the establishment of said other call connection for impressing a call-waiting tone upon said special service line, means controlled by said special service line for completing a connection from said line through to said second appearance exclusively, and means responsive to a signal of predetermined duration from said special service line prior to the enabling of said completing means for releasing said other call connection.

20. In a telephone system, a special service line having two line appearances, means for establishing a dial tone connection to a first one of said appearances, means for completing an incoming connection to the other appearance, means for transmitting a call-waiting tone to said special service line, and means for inhibiting the transmission of said call-waiting tone until the release of said dial tone connection.

21. In a telephone system, a line having a tip party station and a ring party station connected thereto, a regular appearance and an auxiliary appearance for said line, a call-waiting tone source, a busy tone source, means for connecting said busy tone source to said auxiliary appearance when a first call has been connected to one of said stations over said regular appearance and a second call at said auxiliary appearance is to the other of said stations, and means for connecting said call-waiting tone source to said line when the second call at said auxiliary appearance is to said one of said stations.

22. A telephone system comprising a plurality of multistation lines wherein certain of said lines are arranged for special service and are provided with two line appearances, network means operative in response to control signals from a calling station on one of said special service lines for completing a connection from said calling station via one of said appearances, means enabled by an incoming call to a called station on said special service line and responsive to the busy condition of said one of said appearances for selecting the other of said appearances, means for applying a call-waiting signal to said special service line, first means for identifying said calling station, second means for identifying said called station, and switching means controlled by said first and second means for enabling said call-waiting signal means.

23. In a telephone system, the combination set forth in claim 22 wherein said certain lines are each provided with selectively operable means for generating a discrete signal and further comprising means responsive to each repetition of a discrete signal from said special service line for alternately connecting said special service line in privacy to each of said appearances.

24. In a telephone system, the combination set forth in claim 22 wherein said network means further comprises means for completing a connection to said calling station via one of said appearances.

25. In a telephone system, the combination set forth in claim 22 further comprising busy tone means for applying a busy tone signal to said other appearance, and wherein said switching means comprises means controlled by said first and second means for inhibiting said call-waiting signal means and enabling said busy tone means.

26. In a telephone system, a switching circuit comprising a first and a second appearance, a multistation line comprising a tip party station and a ring party station connected to said switching circuit, a source of call-waiting tone connected to said line, common control means comprising a marker operative in response to control signals from a calling one of said stations for extending a connection from said station via one of said appearances, means enabled by an incoming call to one of said stations and responsive to a busy condition of said one of said appearances for selecting the other of said appearances, means for applying ringing potential to said other appearance, said switching circuit comprising ringing detection means associated with said other appearance for detecting the party identity of said called station in response to the application of said ringing potential, called station registration means controlled by said ringing detection means for providing an output indicating said called station party identity, calling station detection means associated with said multistation line for detecting the party identity of said calling station, calling station registration means controlled by said calling station detection means for providing an output indicating said calling station party identity, and enabling means operative in response to an identity of outputs from said called and calling station registration means for enabling said call-waiting tone source.

27. In a telephone system, the combination set forth in claim 26 wherein said other appearance comprises a two-conductor communication path, and said ringing detection means comprises a first relay winding and a first voltage responsive device connected in series between said conductors and a second relay winding and a second voltage responsive device oppositely poled with respect to said first device connected in series between said conductors.

28. In a telephone system, the combination set forth in claim 27 wherein said ringing detection means further comprises groups of contacts controlled by said first and second relay windings respectively, and said called station registration means comprises a third relay winding energized in response to the enabling of contacts associated with said first relay winding and a fourth relay winding energized in response to the enabling of contacts associated with said second relay winding.

29. In a telephone system, the combination set forth in claim 26 wherein said multistation line comprises a two-conductor communication path, and said calling station detecting means comprises a transformer having a primary and a secondary winding, said secondary winding connected in series with said two-conductor communication path,
a detecting relay winding connected to the midpoint of said transformer secondary winding, and
a plurality of contacts controlled by said detection relay winding connected to contacts controlled by said third and fourth relay winding for connecting said tone source to said transformer primary winding.

30. In a telephone system,
a line having two sets of line appearances,
means for establishing a connection via a first one of said appearances to said line,
means for establishing subsequent calling and called connections to the second one of said appearances,
privacy means operative upon the establishment of one of said calling connections and responsive to each repetition of a discrete signal from said line for alternately connecting said line exclusively to each of said appearances, and
conference means operative automatically upon the establishment of one of said called connections for connecting said line concurrently to both of said appearances in conference fashion.

31. In a telephone system,
the combination set forth in claim 30 wherein said line comprises selectively operable means for generating a discrete signal and further comprising means operative in response to a discrete signal from said line for enabling said line to control the establishment of said called connection.

32. In a telephone system,
the combination set forth in claim 30 further comprising a call-waiting tone source connected to said line, and
means responsive to the establishment of said calling connection for momentarily enabling said call-waiting tone source.

33. In a telephone system,
the combination set forth in claim 30 further comprising a subset connected to said line,
wherein said privacy means comprises first means associated with said second appearance operative to indicate that a calling connection has been established to said second appearance,
second means controlled by said line for detecting the off-hook and on-hook condition of said subset,
third means controlled by said second means for causing the disconnecting of said one line from said first appearance, the bridging of said first appearance, and the connecting of said one line to the second of said appearances, and
fourth means controlled by said first means for causing the disconnection of said one line from said second appearance, the bridging of said second appearance, the removal of said bridge from said first appearance, and the reconnection of said line to said first appearance.

34. In a telephone system,
the combination set forth in claim 30 further comprising a subset connected to said line, and
common control means controlled by said subset for establishing said called connection to said second appearance,
wherein said conference means comprises first means controlled by said line for detecting the off-hook and on-hook condition of said subset and
second means controlled by said first means for causing the disconnection of said one line from said first appearance, the bridging of said first appearance and the connection of said one line to said second appearance.

35. In a telephone system,
a subscriber line having a regular and an auxiliary appearance,
means responsive to a discrete signal from said subscriber line when a second call is connected to said auxiliary appearance and a first call is connected to said regular appearance for connecting said subscriber line to said auxiliary appearance to the exclusion of said regular appearance,
and means responsive to said discrete signal from said subscriber line and the origination of a second call from said auxiliary appearance when a first call is connected to said regular appearance for connecting said subscriber line to both said regular and auxiliary appearances.

References Cited by the Examiner

UNITED STATES PATENTS

| | | | |
|---|---|---|---|
| 3,133,995 | 5/1964 | Zarouni | 179—84 |
| 3,231,678 | 1/1966 | Ward et al. | 179—18 |

KATHLEEN H. CLAFFY, *Primary Examiner.*

WILLIAM C. COOPER, *Examiner.*